Dec. 15, 1959  J. W. TOMA  2,917,175
UNBALANCE SENSING ARRANGEMENT FOR MACHINES HAVING
A CENTRIFUGAL LIQUID EXTRACTION STEP
Filed Jan. 22, 1959  6 Sheets-Sheet 1

INVENTOR.
JOHN W. TOMA
BY
HIS ATTORNEY

INVENTOR.
JOHN W. TOMA

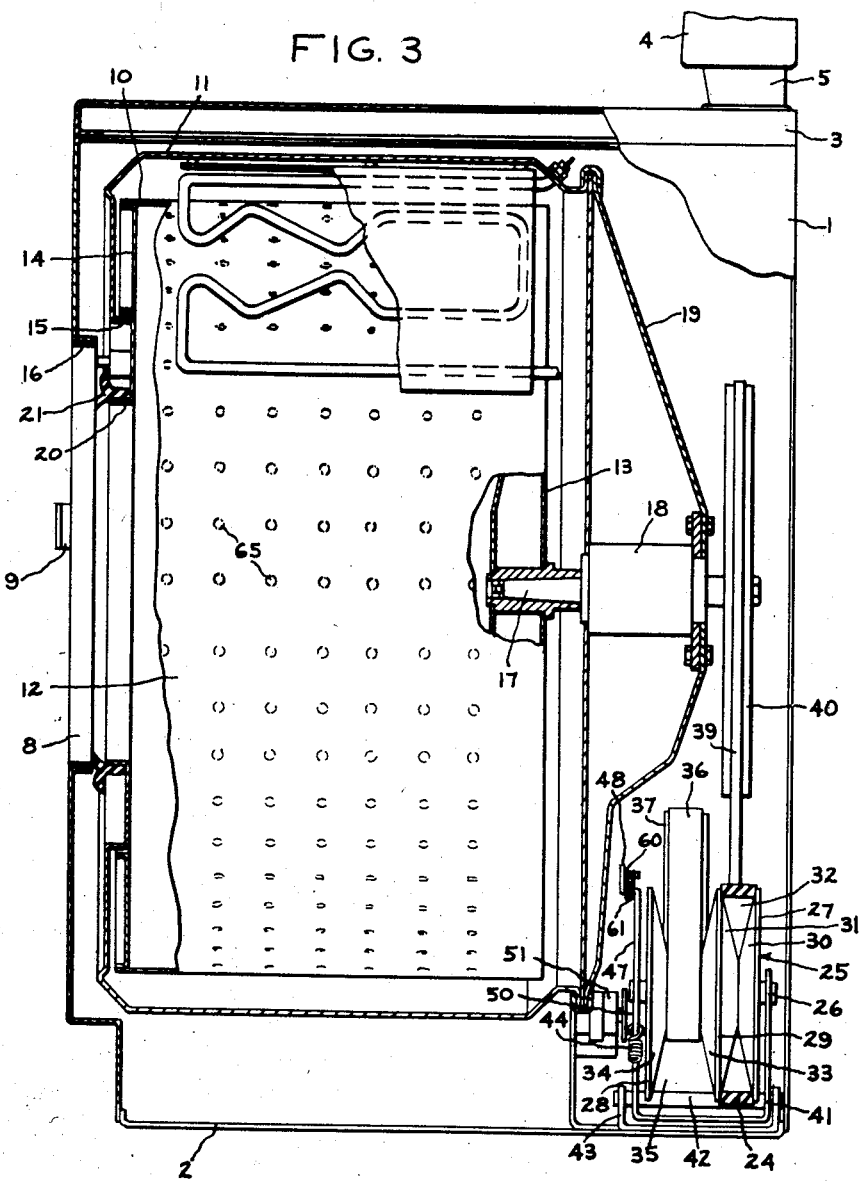

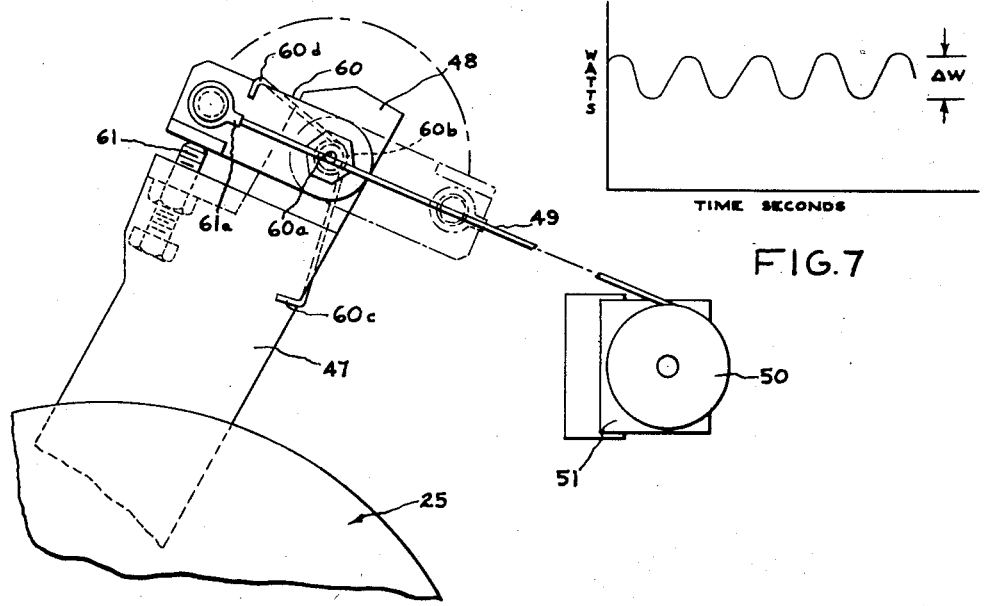
FIG.5
FIG.7
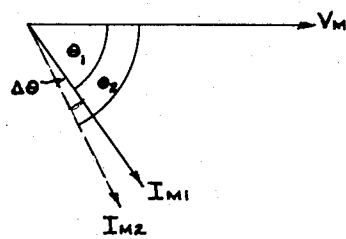
FIG.8
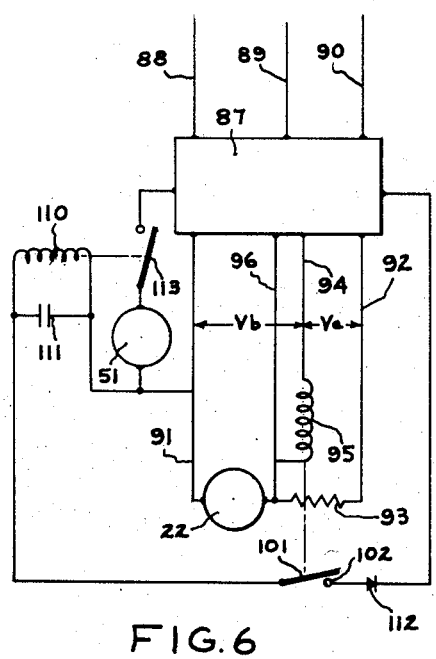
FIG.6
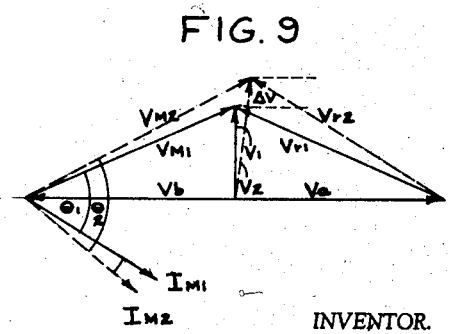
FIG.9
INVENTOR.
JOHN W. TOMA
BY
HIS ATTORNEY Dec. 15, 1959   J. W. TOMA   2,917,175
UNBALANCE SENSING ARRANGEMENT FOR MACHINES HAVING
A CENTRIFUGAL LIQUID EXTRACTION STEP
Filed Jan. 22, 1959   6 Sheets-Sheet 5

INVENTOR
JOHN W. TOMA

BY *Derek P. Lawrence*

HIS ATTORNEY

Dec. 15, 1959   J. W. TOMA   2,917,175
UNBALANCE SENSING ARRANGEMENT FOR MACHINES HAVING
A CENTRIFUGAL LIQUID EXTRACTION STEP
Filed Jan. 22, 1959   6 Sheets-Sheet 6
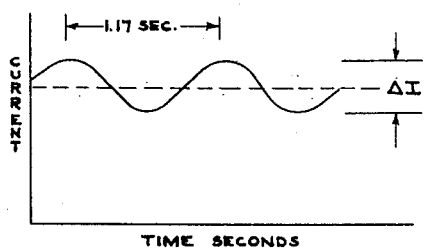
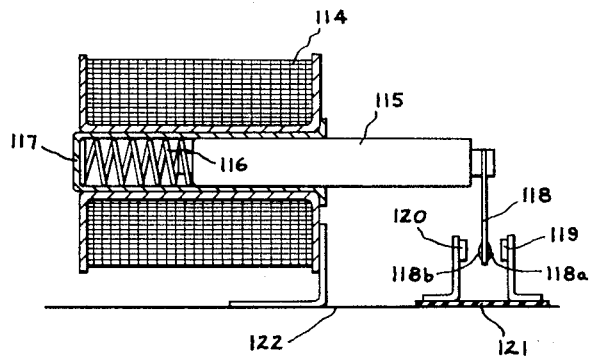
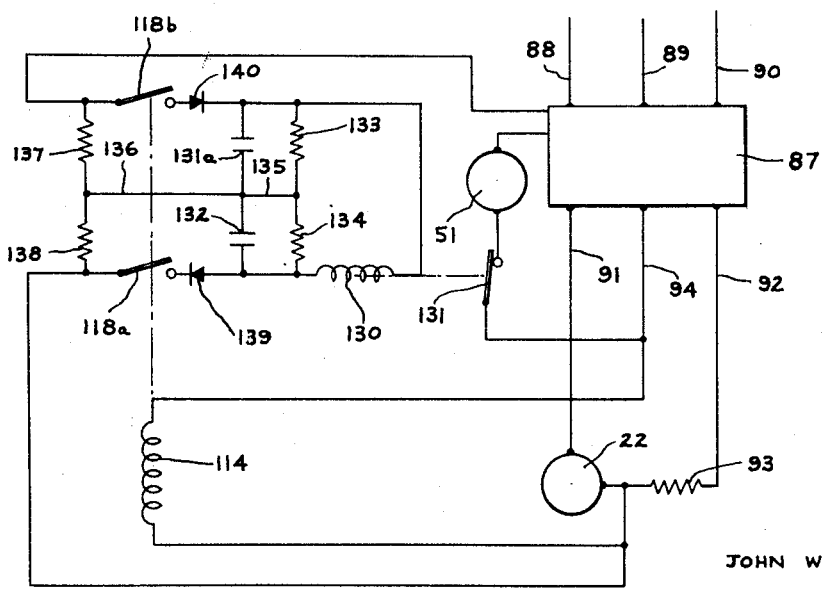
INVENTOR
JOHN W. TOMA
BY *Derek P Lawrence*
HIS ATTORNEY

2,917,175

UNBALANCE SENSING ARRANGEMENT FOR MACHINES HAVING A CENTRIFUGAL LIQUID EXTRACTION STEP

John W. Toma, Louisville, Ky., assignor to General Electric Company, a corporation of New York Application January 22, 1959, Serial No. 788,398

12 Claims. (Cl. 210—144)

This invention relates to an improved unbalance sensing arrangement intended primarily for use in automatic laundry machines of the type having a centrifugal liquid extraction step. More particularly, it relates to an improved unbalance sensing and correcting arrangement which senses the force of gravity acting upon an unbalance in the type of laundry machine having a container or basket rotatable on a substantially nonvertical axis, and transforms the pulsating torque signal thus produced into an electrical signal for controlling the speed of the basket.

When an automatic laundry machine of this type having a rotating basket proceeds from a washing or rinsing step into a centrifugal extraction step, vibration of the basket and of its enclosing tub structure may become quite substantial unless the clothes distribute themselves evenly around the basket. If this even distribution does not occur, the basket is dynamically unbalanced and, to whatever degree this condition exists, the vibration will occur. Actual harm may result to the machine from such vibration; this is particularly so where, because of the increasing demand for machines which take up a relatively small amount of space without any decrease in the load capacity of the machine, the clearance between the parts has been cut down as much as possible.

In the type of machine having a basket rotatable on a substantially nonvertical axis, any unbalance in the clothes distribution within the basket is acted on by the force of gravity. This force of gravity factor exists even before any perceptible amount of vibration has resulted from the unbalance. In other words, because of the gravity force, any unbalance in the basket tends to create a torque in the same direction as the basket rotation when the unbalance is against the basket wall which is moving downwardly, and to create a torque opposing the rotation of the basket when the unbalance is against the wall which is moving upwardly.

It has been discovered that where, as is commonly the case, the rotating basket is powered by an electric motor, these torque signals resulting from the effect of gravity on the rotating unbalance are fed back to the motor. The motor, of course, requires a certain amount of power input proportional to the load it carries; consequently, as the gravity-caused torque helps the motor rotate the basket—when the unbalance is moving down—less power (in watts) is needed, and as the torque acts against the motor—when the unbalance is moving up—more power is needed. The result is a wattage consumption by the motor which varies from a peak to a low point, substantially along a sine wave curve, once for each basket revolution once the clothes are plastered around the basket. It has further been found, in particular connection with conventionally used induction-type motors, that the current change during the wattage variation is very slight; rather it is the phase angle by which the induction motor current lags the voltage that fluctuates to produce the variation in wattage consumption.

It is an object of this invention to utilize this cyclically varying electrical signal to provide a continuous speed controlling signal to the basket so as to redistribute the clothes in response to the sensing of an unbalance of predetermined magnitude.

A further object of the invention is to provide such a machine wherein, upon the sensing of an unacceptable unbalance, the basket rotation is decreased below centrifugal speed through an electrical signal developed from the gravity-caused torque signal so as to permit redistribution of the clothes.

A further object of the invention is to provide an improved washing machine of the type having a centrifugal liquid extraction cycle in which substantial vibrations during extraction are prevented by a sensing system in which gravity-caused torque signals are transformed into electrical speed-controlling signals at or slightly above the speed at which the clothes become plastered around the periphery of the basket.

In one aspect of my invention I provide, in a laundry machine, a clothes basket which is rotatable on a substantially non-vertical axis. Multi-speed drive means are provided for rotating the basket. The drive means includes an electric drive motor, and the basket is responsive to the force of gravity acting on an unbalanced distribution of clothes within the basket to provide a torque feedback to the motor. This results in a cyclic variation in the motor power of a frequency equal to the revolutions per second (r.p.s.) speed of the basket.

The speed transmitted by the drive means to the basket is determined by electrical control means, and a continuous signal is provided to the electrical control means to cause the basket speed to be temporarily decreased for redistribution of the clothes if the unbalance within the basket is unacceptably large. The system for providing this effect includes means for sensing the motor power included in a circuit with the motor so that the sensing means is energized to a cyclically varying extent.

A control electrical circuit is connected to be cyclically modified by the sensing means when the cyclic variation in the energization thereof reaches a predetermined magnitude. When so modified, the control circuit provides a continuous signal to the electrical control means to decrease the basket speed at least to the extent necessary to redistribute the clothes to obtain better unbalance in the basket prior to reacceleration thereof.

The features of my invention which I believe to be novel are set forth with particularity in the appended claims. My invention itself, however, may best be understood by the following description taken in conjunction with the accompanying drawings.

In the drawings, Figure 1 is a front elevational view of a laundry machine, more particularly a combination washer-dryer, of the type which may incorporate my improved clothes distributing arrangement;

Figure 3 is a side elevational view of the machine, partly in section and with certain surfaces broken away to show details;

Figure 5 is an enlarged fragmentary rear elevational view of part of the transmission mechanism;

Figure 6 is a simplified diagram of a control circuit for use with the construction of Figures 1 to 5 and which embodies the improved features of my invention;

Figure 7 is a diagram illustrating a typical watts versus time cyclic variation for the drive motor of the machine;

Figure 8 is a vector diagram illustrating the effect of the torque feedback to the drive motor from an unbalanced rotating basket;

Figure 9 is a vector diagram illustrating the voltage conditions prevailing in certain elements shown in Figure 6;

Figure 14 is a diagram illustrating the cyclic current variation with respect to time in the control pickup coil illustrated in Figure 12;

Figure 15 is a side elevational view of a second type of mechanical relay arrangement which may be utilized in connection with my improved electrical control arrangement; and Figure 16 is yet a third control circuit embodying my invention which may be provided for control of the speed cycle in a machine of the type shown in Figures 1 to 5.

Figure 1:
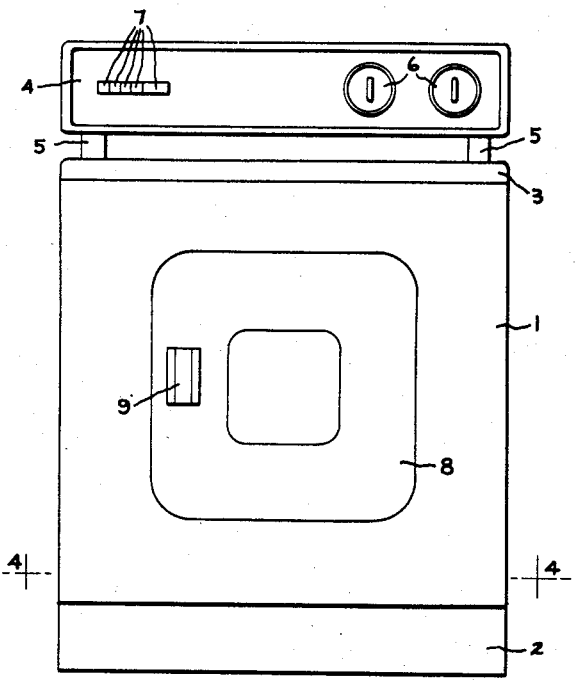
Figure 2:
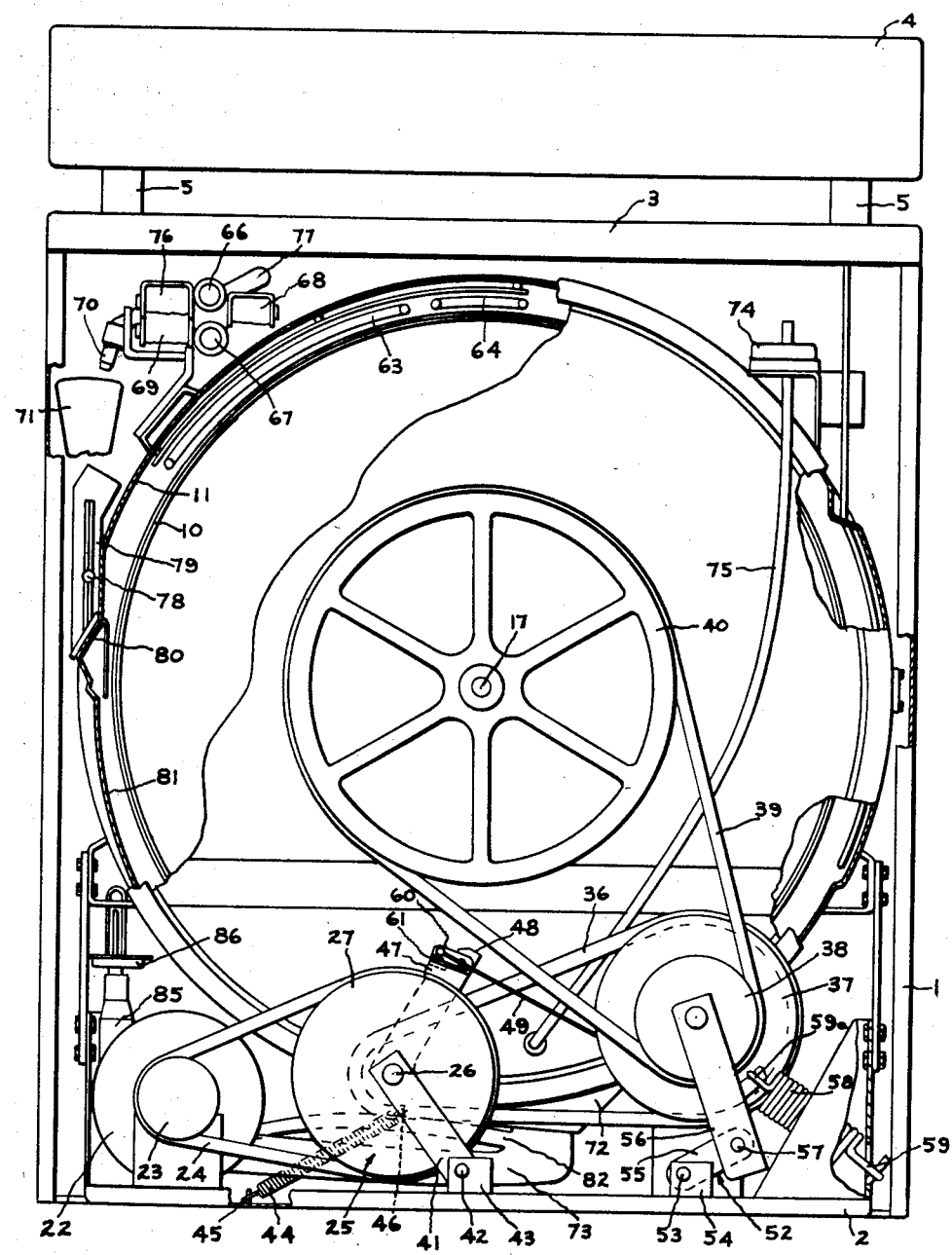
Figure 2 is a rear elevational view of the combination washer-dryer, with the rear panel removed to illustrate details.

Referring now to Figures 1, 2 and 3 of the drawings, there is shown a combination clothes washing and drying machine wherein the operating elements of the machine are included within an outer cabinet structure having a central wrap-around section 1. Section 1 is supported on a base and toe board assembly 2 and carries a separate top 3 on which is supported a backsplash panel 4 mounted on posts 5. Control panel 4 is provided with appropriate control devices such as, for instance, dials 6 which may be provided for controlling various types of washing and drying sequences and various drying temperatures, and such as buttons 7 which may control various other functions such as water temperature, omission of dryer function, etc. Access to the interior of the machine is provided by a door 8 formed in section 1 which is mounted on concealed hinges and is opened by means of knee operated latch control 9.

As best shown in Figure 3, the machine is of the horizontal axis type, that is, it has a substantially cylindrical clothes basket or receptacle 10 mounted for rotation on a generally horizontal axis within an outer enclosing tub structure 11. Basket 10 comprises a cylindrical wall or shell 12 which is closed at its rear end by means of a suitable wall or plate 13. The basket also includes a front wall 14 which is formed so as to define an access or loading opening 15 in registry with an opening 16 provided in wrap-around section 1 for door 8. The basket is rotatably supported by a shaft 17 which is mounted in an elongated bearing 18 supported from rear wall 19 of tub 11. The tub is also provided with an opening 20 aligned with opening 16 and opening 15 so that clothes may be placed into and removed from the basket when door 8 is opened. The door seals against a suitable gasket 21 during operation of the machine.

Figure 4:
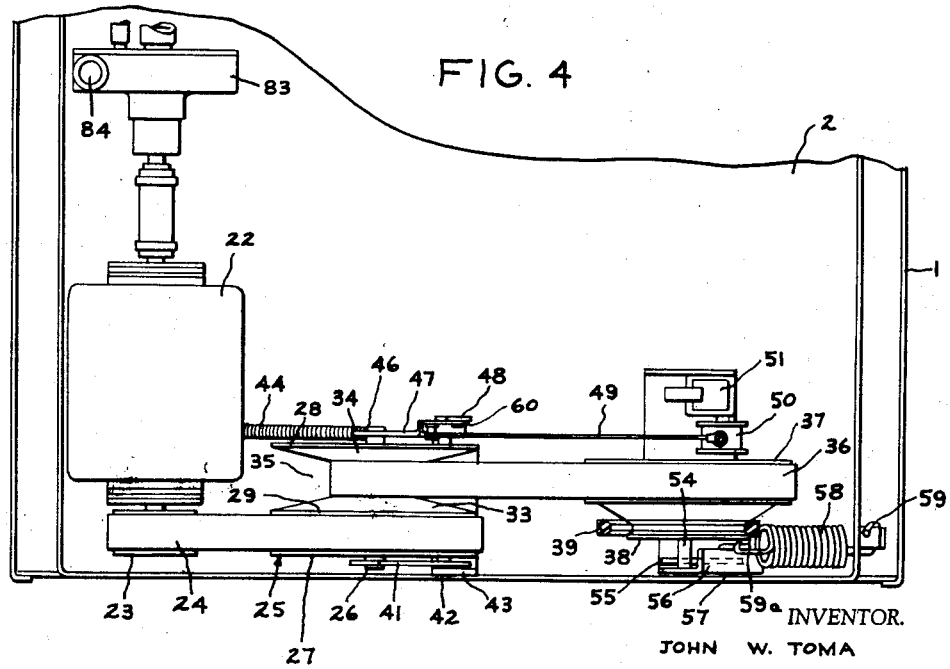
Figure 4 is a fragmentary view in cross section along line 4—4 in Figure 1, with the clothes basket and tub of the machine removed in order to illustrate details of the drive of the machine.

Referring now particularly to Figure 4, and also to Figures 2 and 3, during the operation of the machine the basket 10 is driven from a suitable electric motor 22, preferably of the induction type. The drive from the motor to the basket includes a pulley 23 which is secured to the motor shaft so as to rotate therewith and over which passes a belt 24 which drives an adjustable sheave assembly 25. The adjustable sheave assembly includes a shaft 26 to which are rigidly secured two sheave plates 27 and 28. An intermediate sheave plate 29 is keyed on shaft 26 so as to be movable along the shaft to varying distances from sheave plates 27 and 28. It will be observed (Figure 3) that sheave plate 27 has a sloping surface 30 which, in cooperation with a sloping surface 31 on movable sheave plate 29, forms a groove 32 of adjustable width. Similarly, on its other side, movable sheave plate 29 is provided with a sloping surface 33 which cooperates with a sloping surface 34 of rigidly secured sheave plate 28 to form a second groove 35 of adjustable width. Since belt 24 has a predetermined width, it can be seen that movement of sheave plate 29 relative to sheave plate 27 will cause the belt 24 to seat in groove 32 at a distance from the center of shaft 26 which is determined by the distance of sheave plate 29 from sheave plate 27. The linear speed of belt 24 is constant, assuming the speed of motor 22 to be substantially constant, and therefore the rotational speed of the adjustable sheave assembly 25 is dependent on the effective sheave diameter provided by the cooperation of sheave plates 27 and 29. When the sheave plates 27 and 29 are in the position shown in the figures, sheave assembly 25 is rotating at a relatively low speed. If sheave plate 29 is moved to the left, away from sheave plate 27, as viewed in Figure 3, then belt 24 will move in radially toward shaft 26 as groove 32 widens, and will cause a greater rotational speed of the sheave assembly 25 for a given rotational speed of pulley 23 by motor 22.

A second belt 36 is driven in groove 35 by the sheave formed by the cooperation of sheave plates 29 and 28. When adjustable sheave plate 29 is in the position shown so that groove 35 is quite wide, belt 36 has to move in radially toward shaft 26 a substantial amount before it seats on the surfaces 33 and 34 of sheave plates 29 and 28 respectively.

This means that for a given rotational speed of the adjustable sheave assembly (as imparted to it by belt 24), belt 36 will be travelling at a relatively low rate of linear speed. If sheave plate 29 is moved to the left (Figure 3) so that belt 36 is forced outwardly in groove 35, then for a given rotational speed of the sheave assembly a relatively high linear speed of belt 36 is provided. Thus, by controlling the position of sheave plate 29, an infinite variety of speeds between the two limits of position of the movable sheave plate may be provided, with the arrangement shown in Figure 3 providing the lowest output speed to belt 36 since belt 24 is causing the lowest rate of rotation of sheave assembly 25, and rotation of the sheave assembly 25 is causing the lowest linear speed of belt 36. The highest rate of speed will be provided if sheave plate 29 is moved as far as possible to the left, in which case belt 24 moves inwardly as far as possible to provide the highest rotational speed of the assembly 25 for a given linear speed of belt 24, and the output linear speed of belt 36 is the highest possible for a given rotational speed of the assembly 25.

Belt 36 passes over a sheave 37 which forms part of a unitary assembly with a sheave 38 driving a belt 39. Referring now to Figures 2 and 3, it will be seen that belt 39 drives a sheave 40 which is rigidly secured to the end of shaft 17 so as to rotate basket 10.

Returning now to the adjustable sheave assembly 25, and with particular reference to Figure 2, it will be observed that the assembly is mounted on an arm 41 which is pivotally secured on a pin 42 within a bracket 43 fastened to the base 2 of the machine. A spring 44 has one end 45 secured to the machine base and has its other end 46 secured to a second arm 47 so as to bias the assembly 25 about pin 42 to the left. At the outer end 48 of arm 47 there is secured a chain member 49. At its other end (Figure 4) chain member 49 is secured to a pulley 50 operated through a small electric motor and gear train assembly 51. It will be seen that when pulley 50 is caused to rotate by assembly 51 it will wind up chain 49 and, through arm 47, move the entire adjustable sheave assembly to the right, causing arm 41 to pivot to the right as viewed in Figure 2.

Since belt 24 cannot stretch, it will be apparent that when this occurs belt 24 will move inwardly within groove 32, forcing sheave plate 29 to the left (as viewed in Figure 3) to effect an increase in the speed transmitted to sheave 40 and basket 10. When motor and gear train assembly 51 is shut off, the spring 44 pulls the adjustable sheave assembly 25 back to the position shown in the figures to reduce the speed.

The assembly of sheaves 37 and 38 is mounted on a linkage arrangement 52 pivotally secured on a pin 53 mounted within a bracket 54 fastened to the base. The linkage arrangement includes two arms 55 and 56 which are pivotally secured together through a pin 57. A spring 58, secured at one end 59 to the base 2 of the machine, is secured at its other end 59a to the assembly of sheaves 37 and 38 so as to bias them downwardly and to the right, as viewed in Figure 2, in order to effect a belt tensioning function for belts 36 and 39.

The proportioning of the various parts of the drive assembly above described is such as to provide an appropriate range of speeds. For instance, when the parts are in the position shown a tumbling speed of approximately forty-seven r.p.m. may be provided to the basket, while in the other extreme position a centrifuging speed of approximately three hundred and fifty r.p.m. may be provided to the basket.

In addition to these two speeds, a third speed is briefly provided during acceleration from tumble speed to spin speed by interrupting the movement of sheave assembly 25 to the right by any suitable means. The means, in the present illustration, is provided by a member 60 (Figures 2, 3 and 5) pivotally secured on a pin 60a (Figure 5) mounted in the end 48 of arm 47. A helical spring 60b mounted on pin 60a has one end 60c secured within arm 47, and has the other end 60d engaging member 60 and biasing it counterclockwise against an adjusting screw 61 mounted in arm 47. Chain 49 is secured to projection 61a formed in member 60.

As motor 51 causes chain 49 to exert force to the right, as viewed in Figure 5, it will help spring 60b hold member 60 against screw 61 and will pull arm 47 to the right until the pivoting motion of arm 47 causes the pulling force to exert a clockwise torque on member 60 opposing the action of spring 60b. At this point, further pull by chain 49 will cause member 60 to pivot clockwise about 180° around pin 60a until it is aligned with chain 49, as shown in phantom outline in Figure 5. During this motion of member 60, which takes several seconds, arm 47 remains stationary by virtue of the stabilizing action of spring 60b, after which, when member 60 is in the position shown in phantom, movement of arm 47 to the right is resumed provided motor 51 is still energized. When motor 51 is de-energized and arm 47 is pulled back to its left hand position by spring 44, spring 60b returns member 60 to its engagement with screw 61 so that it is in position to repeat the sequence upon a subsequent acceleration.

It is apparent that during the period that arm 47 is stationary, a pause or dwell at a constant basket speed is provided. Screw 61 is preferably adjusted so that the dwell occurs at a speed of about seventy r.p.m., which is, for a standard twenty-six inch basket, such as described, slightly above the speed at which all of the clothes are plastered about the periphery of the rotating basket.

To heat the clothes during the drying portion of the cycle, where the operator elects to provide such a step, there may be provided in the machine the usual heater assembly including two heaters 63 and 64 (Figure 2). These heaters are mounted within the upper portion of tube 11 so that when energized they heat basket 10. When the heaters are energized, the heat transferred to the basket is then passed onto the clothes to cause vapor migration out of the clothes. Since the outer cylindrical wall of the basket is provided with a substantial number of perforations 65 (Figure 3) some of the heat from the heating elements also passes directly to the clothes by radiation.

The means whereby the water is admitted to and discharged from tub 11 during operation of the machine are particularly shown in Figure 2. The water supply means includes connections 66 and 67 through which hot and cold water is supplied to the machine for the washing operation. A valve controlled by a solenoid 68 admits hot water to the machine and a valve controlled by an opposed solenoid 69 admits cold water to the machine. The hot and cold water valves under the control of the solenoids 68 and 69 discharge through a common outlet conduit 70, through a suitable air gap, and into a funnel 71 to a sump 72 formed at the bottom of tub 11. The connection may be made through a suitable conduit 73, a portion of which is shown adjacent the sump in Figure 2. The air gap provided by the funnel 71 makes it impossible for the water to be siphoned from the machine and to contaminate the incoming water supply line. A pressure actuated sensing device, or water level control, 74 controls both solenoids 68 and 69 to maintain the proper water level in the machine during the washing operation. Sensing device 74 is connected to the interior of tub 11 by a suitable line 75.

The illustrated machine is of the type which uses cold water during the drying cycle for condensing the moisture extracted from the clothes. The condensing water is admitted to the machine through an additional solenoid actuated valve controlled by a solenoid 76 which is energized during the drying operation so that the valve passes water at a slow rate sufficient to condense from the air the moisture vaporized from the clothes. As shown, the condenser water valve discharges into a conduit 77; from this conduit, the water flows through an appropriate air gap (not shown) and through another conduit (not shown) to the inlet 78 of a vent trap 79 which is of the type commonly provided in connection with machines of this type in order to seal off the tub and basket from atmosphere during heat drying of the clothes while leaving the tub vented to atmosphere at other times. An appropriate construction for vent trap 79 is, for instance, fully described and claimed in Patent 2,800,008—Raczynski issued on July 23, 1957 and assigned to the General Electric Company, owner of the present invention. From the vent trap 79, the condenser water flows into the tub 11 through an opening 80 and then flows in a thin sheet down the lower left wall 81 of the tub (Figure 2) so as to cool a substantial portion of the area of the side wall and provide a large cool surface for condensing the moisture extracted from the clothes.

The wash and rinse water used during the washing portion of the operation, and the condenser water and the moisture extracted from the clothes during the drying operation, are discharged from the machine through the sump 72 mounted at the bottom of the tub. A suitable discharge hose 82 leads from the sump to a motor driven drain pump 83 which may, as shown in Figure 4, be driven directly from motor 22 and which discharges through an outlet opening 84 to a conduit 85 (Figure 2) leading to a drain valve 86 controlled by a suitable solenoid (not shown). Since pump 83 is continually operated, the draining of water from sump 70 is controlled by the drain valve, draining occurring upon energization of its associated solenoid.

With the apparatus above described and by the use of suitable well known control arrangements which do not form a part of this invention and are not further described except incidentally in connection with the invention, the machine of Figures 1–6 may be made to proceed through a suitable washing and drying operation, first washing the clothes and then rinsing them as the basket rotates at tumble speed, that is, forty-seven r.p.m., then centrifugally extracting liquid from the clothes by high speed rotation of the basket, and then, where so desired, returning to tumble speed for a heat drying operation to effect substantially complete drying of the clothes. When the time comes to increase the speed from tumble speed to full spin speed, the basket is first brought up from tumble speed to a speed just above the plaster speed, as described above, and is rotated at that speed for a brief period. If the balance is satisfactory for high speed operation of the basket, then the basket is accelerated to a high spin speed. If however, the balance is not satisfactory the basket is slowed down for redistribution of the clothes.

In order to effect this, a suitable control arrangement in accordance with my invention is provided as shown in Figure 6. As shown, there is provided a control device 87 which is connected across the lines 88, 89, and 90 of a three-wire power supply, with the total voltage drop (usually two hundred and twenty volts) appearing across lines 88 and 90, and with half that amount, or one hundred and ten volts, appearing between neutral line 89 and each of lines 88 and 90. While the location of control device 87 in the machine is not important, it is customarily provided within the backsplasher 4.

Motor 22 is operated through control device 87 across a pair of conductors 91 and 92 (i.e., across the 220 volt potential) in series with a resistor 93. Resistor 93 is preferably of low resistance, capable of dissipating a large wattage. The resistance is preferably approximately the same or slightly larger than the impedance of the motor when it is operating at running speed. Between motor 22 and resistor 93 there is provided a neutral conductor 94 which includes appropriate sensing means such as the pickup coil 95 of a voltage relay more particularly discussed herebelow in connection with Figure 10. In parallel with line 94 there is provided a line 96; controller 87 is suitably arranged, by any suitable switching means well known to those skilled in the art, so that line 96 is effective to complete a circuit to motor 22 at all times except when an energizing circuit for accelerating motor 51 is provided through the controller. At such times the circuit for line 96 is opened so that the relay coil 95 (of high impedance since it is provided in a voltage relay) is effectively made a part of the circuit.

Referring now to Figure 7, there is shown a typical wattage variation curve with respect to time as a result of an unbalance torque feedback to the motor from the rotating basket. The greater the unbalance, the greater the torque feedback variation and the greater the wattage variation as indicated by the vertical distance $\Delta w$. It will of course, be understood that while the power provided to the motor is generally the usual sixty cycle power provided for home usage, the frequency of the curve in Figure 7 is determined by the speed of rotation of the basket 10. Thus, in the present case, when the basket is rotated just above plaster speed at seventy r.p.m., the frequency of the wattage variation curve of Figure 7 will be $$\frac{70}{60}$$

or 1.17 cycles per second.

In induction motors, this wattage variation, it has been found, actually results primarily from a change in the phase angle between the motor voltage $V_m$ and the motor current $I_m$ of the motor which, due to the inductive nature of the motor impedance, lags the motor voltage; the quantitative change in the motor current is very slight. In other words, referring to Figure 8, with an unbalance in the basket as it rotates at seventy r.p.m., the phase angle $\theta$ separating the motor voltage $V_m$ from the motor current $I_m$ will vary by the amount $\Delta\theta$ to cause the vectorial $I_m$ to vary from $I_{m1}$ to $I_{m2}$ and then back again.

With the data explained in Figures 7 and 8, and with motor 22, voltage coil 95, and resistor 93 connected as described in Figure 6, a vector diagram as shown in Figure 9 develops. Specifically, if it be assumed that the impedance of resistor 93 is the same as the impedance of motor 22 during operation thereof, then, with conductor 94 and coil 95 connected between them, the voltage $V_a$ across neutral 94 and conductor 92 is substantially equal to the voltage $V_b$ across neutral 94 and conductor 91. The sum of $V_a$ plus $V_b$ is the sum of the voltages across the two lines 91 and 92; the sum of the voltages is also, of course, obained by vectorial addition of the motor voltage $V_m$ and the resistor voltage $V_r$. The inductive nature of the motor causes a phase angle displacement of $V_m$ and $V_r$ from $V_a$ and $V_b$; the voltage $V$ across coil 95 in neutral line 94 is the result of the vectorial difference between $V_b$ and $V_m$.

Figure 10:
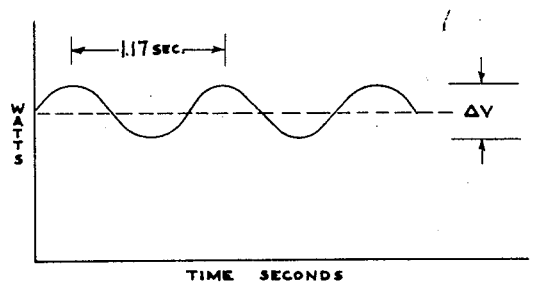
Figure 10 is a diagram illustrating the cyclic voltage variation versus time for one of the elements shown in Figure 6.

It will be recalled from Figure 8 that the motor current $I_m$ lags the motor voltage $V_m$ by a phase angle $\theta$, and that torque feedback from the basket causes variation of this angle from $\theta_1$ to $\theta_2$, that is, the phase lag of $I_m$ behind $V_m$ varies by $\theta_1 - \theta_2$, or $\Delta\theta$. Inasmuch as there is no phase difference at all between the current and voltage through a pure resistance such as resistor 93, the current passing through the motor and the resistor is always in phase with, i.e., vectorially parallel to, the voltage across the resistor. Therefore, as the angle of the motor current $I_m$ changes, the angle of the resistor voltage $V_r$ will change correspondingly as shown by the change from $V_{r1}$ to $V_{r2}$ as the current changes from $I_{m1}$ to $I_{m2}$. This change in the resistor voltage has the result of changing the voltage across coil 95 from $V_1$ to $V_2$ as shown in Figure 9 so that the coil voltage $V$ is increased by $\Delta V$. The voltage across coil 95, then, varies from $V_1$ to $V_2$ and $\Delta V$, the difference between $V_1$ and $V_2$, is a function of the magnitude of the torque feedback pulsation causing the phase variation in the motor. The magnitude of this voltage variation follows a frequency curve the same as that of the wattage as shown in Figure 10, that is, the frequency is 1.17 cycles per second, with the magnitude of $\Delta V$ being a function of the magnitude of the torque feedback.

Figure 11:
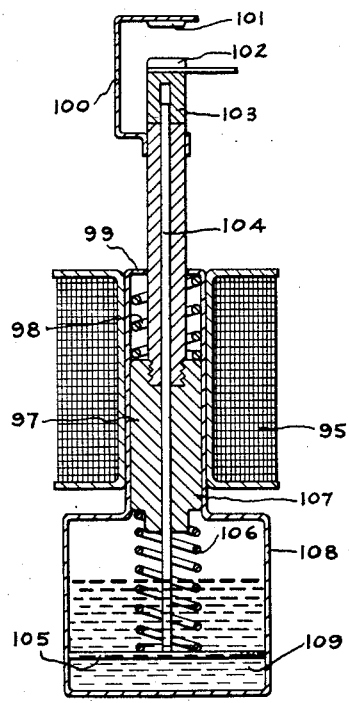
Figure 11 is a side elevational view of one mechanical relay construction in which the control pickup coil of Figure 6 may be used.

Referring now particularly to Figure 11, it will be observed that coil 95 forms part of a relay which also includes a plunger or armature member 97 biased by a spring 98 secured in position within a retainer member 99. Plunger member 97 has a bracket 100 secured thereto, with a contact 101 being provided secured to the bracket as shown. Contact 101 is engageable by a contact 102 secured at the top of a large end portion 103 formed at the end of a rod 104. Rod 104 extends upwardly through plunger 97 in movable relation thereto. It will readily be seen that upward movement of the plunger will cause the top of the plunger member to engage the large head portion 103 so that the two contacts 101 and 102 rise together in separated relation as shown.

The contacts are biased to their separated relationship by any suitable means such as a flange 105 formed at the bottom of rod 104 and a relatively light spring 106 positioned to bias the bottom portion 107 of plunger member 97 and the flange 105 away from each other. As shown, the flange 105 is positioned to move in a container 108 of viscous damping liquid 109. As a result of the varying voltage energizing coil 95, plunger 97 is pulled upwardly to a degree dependent on the voltage at the upper peak of the voltage variation and is pushed back down by spring 98 to a degree dependent on the amount of decrease from peak voltage at the lower point of the voltage variation. In other words, the movement of plunger 97 becomes more pronounced as $\Delta V$ increases.

Spring 98 is substantially stiffer than spring 106, so that spring 106 has relatively little effect on the interaction of the energized relay coil 95 and the spring 98. As the plunger rises it forces the rod 104 carrying contact 102 upwardly at the same rate, so that the contacts remain apart. However, as the spring 98 forces the plunger 97 down, contact 102 does not go down as rapidly because of the damping action of fluid 109 on the flange 105 secured at the bottom of rod 104. Consequently, at a predetermined magnitude of the voltage variation ΔV, the movement of the plunger 97 becomes great enough so that contact 102 lags so far behind the downwardly movement of contact 101 that they engage each other during each downward stroke. Thus, at a predetermined magnitude of ΔV, contacts 101 and 102 engage once each cycle of the voltage wave resulting from the torque feedback from the basket.

Returning now to Figure 6, it will be seen that contacts 101 and 102 form part of a circuit which includes in parallel a solenoid coil 110 and a capacitor 111. A rectifying device 112 is provided in the circuit to insure direct current through the capacitor. Coil 110 controls a normally closed contact 113 which is in series with the accelerating control motor 51.

The circuit including coil 110 and capacitor 111, and the circuit including the accelerating motor 51 are both completed through the controller 87. When the controller 87 makes these circuits effective, a closing of contact 101 with contact 102 will energize coil 110 to open the normally closed contact 113. It will, of course, be remembered that the closing of contacts 101 and 102 is only momentary, the contacts opening once during each cycle. However, once the coil 110 has been energized and the capacitor 111 has been charged by the closing of contacts 101 and 102, then, when contact 101 opens, the capacitor 111 will discharge through coil 110 so that the coil remains energized to keep contact 113 open for a finite time after the opening of contact 101. The coil 110 and capacitor 111 are selected relative to each other so that the capacitor discharges through the coil keeping it energized for a long enough period for the closing of contacts 101 and 102 at the same point in the next cycle. In this manner, although contacts 101 and 102 open and close cyclically when the magnitude of the torque feedback variation causes a predetermined magnitude of ΔV, the coil 110 is continuously energized to provide a continuous opening signal to switch 113. This causes motor 51 to be de-energized, and the basket to be decelerated as the spring 44 returns the movable sheave assembly 25 to the left as viewed in Figure 2.

A brief description of the sequence of operation will now be given in order to provide an understanding of the invention. To start, the controller 87 causes the machine to go through the usual series of washing and rinsing operations, with motor 22 being energized through the controller throughout these operations and with motor 51 being de-energized so that the basket is rotated at the low or tumble speed. During these operations, suitable connections from controller 87 cause the water supply solenoids 68 and 69 and the drain solenoid (not shown) to function in proper sequence to fill the tub 11 to a proper level and then to drain the tub so that the various washing and rinsing operations are performed. These sequences and connections are matters well known to those skilled in the art and will not be further described herein except to state that the controller 87 may, of course, be designed to control all the other electrical equipment in the machine such as the solenoids just mentioned, and the heaters 63 and 64, as well as the particular items shown in Figure 6.

After the wash and rinse sequences, the controller 87 causes an energizing circuit to be completed through the accelerating motor 51. The basket is then accelerated until it reaches seventy r.p.m. at which point the pause mechanism causes it to continue rotation at seventy r.p.m. for a period which may, for instance, be on the order of 3 seconds. During this period of rotation at seventy r.p.m., the clothes are plastered and the motor requires a fluctuating cyclic wattage, as shown in Figure 7, the fluctuation being dependent upon the degree of unbalance of the clothes in the basket. As has been explained, the particular circuitry causes this varying wattage to be changed into a voltage signal across coil 95; the device shown in Figure 11 utilizes the voltage variation so that if it reaches a predetermined magnitude indicating a certain degree of unbalance in the basket, contact 101 will engage 102 once each cycle and, as explained, this will cause contact 113 to be continuously opened so that the apparatus will decelerate to tumble speed again.

The characteristics of coil 95 are selected so that the voltage variation which causes closing of contacts 101 and 102 represent a degree of unbalance within the basket which will cause undesirable vibrations and possible harm to the machine if the unbalance is allowed to exist at the relatively high speed rotation to which the basket is subjected for centrifugal extraction of liquid from the clothes. By the same token, if the voltage variation is not large enough to cause closing of contact 101 with contact 102 then the unbalance within the basket is small enough to be acceptable at spin speeds. If contact 101 does not close, the basket—after the pause provided by the mechanism described in connection with Figure 2—accelerates basket 10 to the spin speed and the spin operation will take place for a period as prescribed by controller 87, followed (if so desired by the operator) by a heat drying operation with energization of heaters 63 and 64.

Where, however, contact 101 is being cyclically closed, then the accelerating motor is de-energized and the speed returns to tumble. During the deceleration from plaster speed to tumble the unbalance is sufficiently large as a result of the deceleration itself that contact 101 continues to be closed frequently; this insures that the accelerating motor remain de-energized until a speed has been reached at which the clothes redistribute themselves again. At this point, another attempt is made at spin with the accelerating motor 51 being energized to bring the basket up to the speed of seventy r.p.m. as before and the sequence repeats itself, with the speed being returned to tumble if the unbalance is too large and with the speed being increased to spin if the unbalance is acceptable. It can thus be seen that with the arrangement described, the reaction of the motor in wattage demand as a result of varying torque feedback because of unbalances in the rotating basket is used to effect redistribution if the unbalance is unsatisfactory and to permit the speed to be increased to spin if the unbalance is acceptable.

Figure 12:
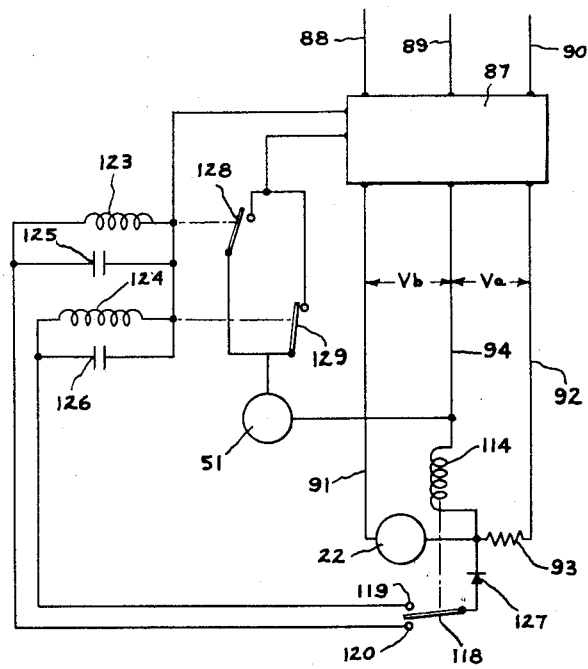
Figure 12 is a schematic diagram of a second embodiment of a control circuit provided for use with a machine of the type shown in Figures 1 to 5.
Figure 13:
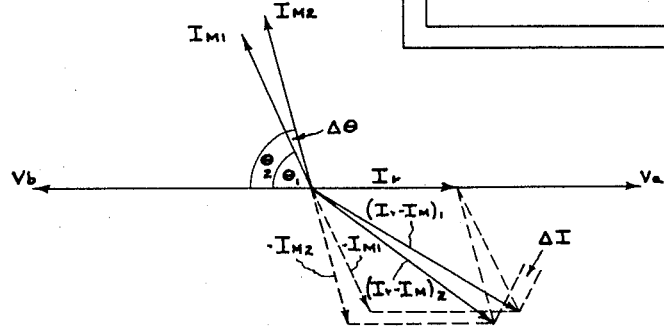
Figure 13 is a vector diagram illustrating the current conditions prevailing at a given instance in various components shown in Figure 12.

Referring now to Figures 12, 13 and 14 a second embodiment of the improved electrical control arrangement of this invention is illustrated. As before, induction-type motor 22 and resistor 93 are in series, connected through controller 87 by conductors 91 and 92, and a neutral conductor 94 is connected between the motor and the resistor. Connected in line 94 is a relay coil 114 which is intended to be responsive to current rather than to voltage. As is well known, the only substantial difference in design between these two types of coils is that a voltage coil is of high impedance so as to decrease to a substantial extent the current therethrough and provide a large voltage drop while a current relay coil is of relatively low impedance so that the voltage drop across it is low but leaves the circuit current substantially unchanged. One difference to be noted between the use of the voltage type relay, such as 95, in Figure 6, and a current type relay coil 114 is that, with the current type relay coil, the fact that the coil affects the circuit very little by its presence means that it is not necessary to provide means for keeping the coil out of the circuit except at the specific time that it is being used. Thus, it is not necessary to provide an alternative means such as conductor 96 in parallel with the coil as has been done in the embodiment of Figure 6.

Referring now to the vector diagram shown in Figure 13, it will be seen that, as before, the resistor being substantially equal in impedance to the motor during running operation thereof, the voltages thereacross are substantially equal. Further, since a substantially pure resistance has no phase angle, the current through the resistor is substantially in phase with the voltage thereacross as is shown. However, the motor current lags the voltage across the motor as shown by the phase angle $\theta$, and where a torque feedback from an unbalanced rotating basket is sensed, $\theta$ varies between $\theta_1$ and $\theta_2$ to provide a difference of $\Delta\theta$. With coil 114 connected in a neutral line between the motor and the resistor, the coil senses the difference between the resistor current and the motor current; that is, $I_r$ minus $I_m$.

As shown in the vector diagram, a change in the phase angle, even though the motor current remains substantially constant, causes a difference in the current through coil 114, the difference appearing as $\Delta I$ in Figure 14. $\Delta I$ has a frequency determined by the rotational velocity of the basket; in this case, where the basket is deliberately set to rotate at seventy r.p.m. for a period, the frequency is thus 1.17 cycles per second.

With this arrangement the coil 114 may, if so desired, be incorporated in the type of mechanism shown in Figure 11 so that, as described in that figure and in connection with Figure 6, proper control of motor 41 is achieved. However, to illustrate another control arrangement which may be provided, I have shown in Figure 15 a second arrangement which may be utilized for my desired purpose. Referring now to Figure 15, it will be observed that coil 114 forms part of a relay having a plunger 115 which is biased by a spring 116 secured in a retainer member 117 to a position extending out of the coil. At the end of plunger 115 there is provided an arm 118 carrying movable contact members 118a and 118b. Contact 118a is intended to engage a contact 119 and contact 118b is intended to engage a contact 120, depending upon whether the spring 116 pushes the plunger to the right as shown to cause engagement with contact 119 or whether the relay coil 114 is sufficiently energized to pull the plunger to the left for engagement with contact 120. Contacts 119 and 120 are mechanically secured together by an insulating piece 121 so as to be slidable on a surface 122. There is sufficient frictional damping between piece 121 and surface 122 to prevent sliding except under positive application of a force, as from arm 118, for instance. It will thus be seen that regardless of the average level of the current through coil 114 the plunger will carry with it the assembly of contacts 119 and 120 so that arm 118 is always between them.

The magnitude of oscillation of plunger 115 is determined by the magnitude of the cyclical variation of $\Delta I$. In order words, as the amount of current through coil 114 reaches its peak, the plunger 115 will be pulled back into the coil to a substantial extent, and as it reaches its lowest point the spring will push the plunger back out. The magnitude of this motion is dependent on $\Delta I$, or the amount of difference between the high point and the low point of the current each cycle. Thus, by proper design, when the current variation is large enough to indicate that the unbalance in the basket will cause undesirable vibrations at high spin speeds, the oscillation of plunger 115 is such as to cause contacts 118a and 118b to alternately engage contacts 119 and 120 once each cycle. If the current variation is less than the critical amount, then the oscillation of the plunger will cause, at most, cyclical engagement of one of contacts 118a and 118b.

Returning now to Figure 12, it will be seen that the movable contacts 118a and 118b engage contacts 119 and 120 alternately once each cycle when the torque feedback from the basket 10 indicates that an undesirable unbalance is present, but engage neither of the contacts 119 and 120 or only one of them if the torque feedback variation is less than this. In the arrangement of Figure 12, there are provided two solenoid coils 123 and 124 which are respectively in parallel with capacitors 125 and 126. A circuit to energize solenoid 123 and charge capacitor 125 is made upon engagement with contact 119 and a circuit to energize coil 124 and charge capacitor 126 is made upon engagement with contact 120. As before, a suitable rectifying device 127 is provided in the circuit.

Solenoid coil 123 controls a movable contact member 128 and solenoid coil 124 controls a movable contact member 129. Contact members 128 and 129 are in parallel with each other and are both in series with the accelerating motor 51 in the circuit for energizing that motor through the controller 87. Thus, it is clear that should either one of the two contacts 128 and 129 remain closed the accelerating motor remains energized during periods when the circuit is completed through the controller. Both contacts are normally closed, that is, it requires energization of the associated coil in order to open each contact. Thus, when contact is made with only one of the two contacts 119 and 120 because the torque feedback pulsation from the basket is low enough to indicate a permissible unbalance, at least one of the two coils 123 and 124 will remain deenergized and one of the two contacts 128 and 129 will complete the energizing circuit for accelerating motor 51 to provide a spin operation. However, if the torque feedback becomes great enough that $\Delta I$ causes coil 114 to move contacts 118a and 118b alternately into engagement with contacts 119 and 120, each cycle, then this alternately causes coil 123 to be energized and capacitor 125 to be charged, and coil 124 to be energized and capacitor 126 to be charged. Each coil and capacitor are so designed with respect to each other that for a definite period after disconnection from the power source the capacitor will discharge through the coil with which it is associated so that the coil remains energized. Thus, where a circuit is completed to each of the contacts 119 and 120 once each cycle, each capacitor will keep its associated coil energized all the time with the result that by the energization of the coils the contacts 128 and 129 will both be opened to cause de-energization of motor 51. This will then cause a deceleration to tumble and, as described in connection with Figure 6, the basket will decelerate to tumble and then accelerate to the sensing speed of seventy r.p.m. for another pause to determine if the balance is yet acceptable for a high speed spin operation.

It will be seen that the arrangement of Figure 12 achieves substantially the same results as that of Figure 6 in a generally similar manner. There are the differences that it uses a current responsive relay coil instead of a voltage responsive relay coil, and it shows the use of a different type of relay in cooperation with a different type of circuit for controlling the condition of the accelerating motor circuit.

Referring now to Figure 16, yet another type of circuit for controlling the energization of accelerating motor 51 is provided. In this arrangement, the relay of Figure 15 is used, and the same type of current relay arrangement as in Figure 12 is used; therefore, these arrangements need not be further described in connection with Figure 16. A single solenoid coil 130 is provided controlling a contact 131 which is normally closed in series with the accelerating motor 51. A pair of resistor-capacitor networks are provided, with capacitors 131a and 132 and resistors 133 and 134 all being connected in circuit with the coil 130. A conductor 135 connects the midpoint of the two capacitors to the midpoint of the two resistors. Another conductor 136 connects the midpoint of the two capacitors to the midpoint of two other resistors 137 and 138 which are connected across the entire circuit for voltage stabilizing purposes. The coil 130 is so designed with respect to the two capacitors that it is sufficiently energized to operate contact 131 to open position only when it is connected across the power source and a capacitor is simultaneously discharging through it.

Thus, if ΔI should not be great enough to cause alternating engagement of contacts 118a and 118b with contacts 119 and 120 once each cycle, one or the other of capacitors 131a and 132 will remain discharged and relay 130 cannot be energized enough to operate contact 131. However, when the unbalance in the basket becomes large enough for ΔI to cause alternate closing of the contacts once each cycle, at the same time that the relay is being energized in parallel with capacitor 132 by the closing of contact 118a, the other capacitor 131a, which has just been charged, will be discharging through the relay, thereby providing sufficient energization thereof to move contact 131 to open position. When the contact arm 118 moves to its other engaging position, opening contact 118a and closing contact 118b, the relay will be energized in parallel with capacitor 131a, and the capacitor 132 which has just been charged will discharge through the relay to continue the energization thereof at a level sufficient to keep contact 131 open. Thus, alternate opening and closing of contacts 118a and 118b is necessary in order for contact 131 to be retained open by coil 130 in order to provide the desired controlling effect.

It will be seen from the foregoing that my invention provides an improved arrangement for taking the torque feedback caused by gravity acting on an unbalance within the rotating basket and converting it into an electrical control signal for determining whether the basket shall be accelerated to a relatively high spin speed or shall be returned to tumble speed for redistribution of the clothes therewithin.

It will further be seen that my electrical system is operative in response to the torque feedback at a speed level where harmful vibrations do not occur so that the likelihood of harmful vibrations can be sensed before they exist.

While in accordance with the patent statutes I have shown what at present are considered to be the preferred embodiments of the invention, it will be obvious to those skilled in the art that various changes and modifications may be made therein without departing from the invention, and I therefore aim in the appended claims to cover all such changes and modifications which fall within the true spirit and scope of my invention.

What I claim as new and desire to secure by Letters Patent of the United States is:

1. In a laundry machine, a clothes basket rotatable on a substantially non-vertical axis; multi-speed drive means for rotating said basket including an electric drive motor, said basket being responsive to the force of gravity acting on an unbalanced plastered distribution of clothes within said basket to provide a varying torque feedback to said motor resulting in a cyclic variation of the motor power of the same frequency as the r.p.s. speed of said basket; electric control means for determining the speed transmitted by said drive means to said basket; electrically energizable power sensing means; a sensing circuit including said sensing means and said motor connected so that said sensing means senses the motor power consumption and energization of said sensing means is cyclically varied in proportion to the magnitude of said motor power consumption variation; and a control circuit connected to be cyclically modified by said sensing means when the variation in said sensing means energization reaches a predetermined magnitude, said control circuit providing during said cyclic modification a continuous signal to said electric control means to cause said drive means to decrease the basket speed sufficiently to effect redistribution of the clothes.

2. In a laundry machine, a clothes basket rotatable on a substantially non-vertical axis; multi-speed drive means for rotating said basket including an electric induction-type drive motor, said basket being responsive to the force of gravity acting on an unbalanced plastered distribution of clothes within said basket to provide a varying torque feedback to said motor resulting in a cyclic variation in the phase angle of the motor power of the same frequency as the r.p.s. speed of said basket; electric control means for determining the speed transmitted by said drive means to said basket; electrically energizable phase angle sensing means; a sensing circuit including said sensing means and said motor connected so that said sensing means senses the phase angle variation and energization of said sensing means is cyclically varied in proportion to the magnitude of said motor power phase angle variation; and a control circuit connected to be cyclically modified by said sensing means when the variation in said sensing means energization reaches a predetermined magnitude, said control circuit providing during said cyclic modification a continuous signal to said electric control means to cause said drive means to decrease the basket speed sufficiently to effect redistribution of the clothes.

3. In a laundry machine, a clothes basket rotatable on a substantially non-vertical axis; multi-speed drive means for rotating said basket including an electric induction-type drive motor, said basket being responsive to the force of gravity acting on an unbalanced plastered distribution of clothes within said basket to provide a varying torque feedback to said motor resulting in a cyclic variation in the phase angle of the motor power of the same frequency as the r.p.s. speed of said basket; electric control means for determining the speed transmitted by said drive means to said basket; a relay having a pickup coil; a sensing circuit including said relay coil and said motor connected so that said relay senses the phase angle variation and energization of said relay coil is cyclically varied in proportion to the magnitude of said motor power phase angle variation; and a control circuit connected to be cyclically modified by said relay when the variation in said relay coil energization reaches a predetermined magnitude, said control circuit providing during said cyclic modification a continuous signal to said electric control means to cause said drive means to decrease the basket speed sufficiently to effect redistribution of the clothes.

4. In a laundry machine, a clothes basket rotatable on a substantially non-vertical axis; multi-speed drive means for rotating said basket including an electric induction-type drive motor, said basket being responsive to the force of gravity acting on an unbalanced plastered distribution of clothes within said basket to provide a varying torque feedback to said motor resulting in a cyclic variation in the phase angle of the motor power of the same frequency as the r.p.s. speed of said basket; electric control means for determining the speed transmitted by said drive means to said basket; a sensing circuit including an impedance connected in series with said motor across the source of power, said circuit further including a neutral conductor connected between said motor and said impedance, a relay having a pickup coil connected in said neutral conductor so as to sense a differential electrical value whose magnitude depends on the amount of torque feedback variation; and a control circuit connected to be cyclically modified by said relay when the variation in the sensed electrical value resulting from torque feedback from said basket reaches a predetermined level, said control circuit providing during said cyclic modification a continuous signal to said electric control means to cause said drive means to decrease the basket speed sufficiently to effect redistribution of the clothes.

5. The apparatus defined in claim 4 wherein said pickup coil has a relatively high impedance thereby making said coil sensitive to the voltage drop thereacross, said apparatus further including a conductor in parallel with said pickup coil, said parallel conductor being disconnected during periods when sensing of the unbalance within said basket is desired and being connected at other times.

6. The apparatus defined in claim 4 wherein said pickup coil has a relatively low impedance whereby said relay is responsive to the variations in current through said coil, said pickup coil being permanently connected in said sensing circuit.

7. In a laundry machine, a clothes basket rotatable on a substantially non-vertical axis; multi-speed drive means for rotating said basket including an electric induction-type drive motor, said basket being responsive to the force of gravity acting on an unbalanced plastered distribution of clothes within said basket to provide a varying torque feedback to said motor resulting in a cyclic variation in the phase angle of the motor power of the same frequency as the r.p.s. speed of said basket; electric control means for determining the speed transmitted by said drive means to said basket; a relay having a pickup coil; a sensing circuit including said relay coil and said motor connected so that said relay senses the phase angle variation and energization of said relay coil is cyclically varied in proportion to the magnitude of said motor power phase angle variation; and a control circuit including a normally open contact controlled by said relay coil and closed once each cycle when the variation in said relay coil energization reaches a predetermined magnitude; a control circuit including a solenoid coil and a capacitor in parallel with each other in said control circuit, said control circuit further including rectifying means for providing direct current power for charging said capacitor; contact means in circuit with said electric control means controlling operation thereof, said contact means being biased to one position and being moved to the other position by said solenoid coil when it is energized, said one position causing said control means to provide for high speed operation of said basket and said other position causing provision of low-speed rotation of said basket, said solenoid coil and said capacitor being formed so that upon cyclic closing of said relay contact said capacitor discharges through said solenoid coil between closings to a sufficient extent to retain said solenoid coil energized continuously whereby the basket speed is decreased sufficiently to effect redistribution of the clothes.

8. In a laundry machine, a clothes basket rotatable on a substantially non-vertical axis; multi-speed drive means for rotating said basket including an electric induction-type drive motor, said basket being responsive to the force of gravity acting on an unbalanced plastered distribution of clothes within said basket to provide a varying torque feedback to said motor resulting in a cyclic variation in the phase angle of the motor power of the same frequency as the r.p.s. speed of said basket; electric control means for determining the speed transmitted by said drive means to said motor, said control means when energized providing for high basket speed and when de-energized providing for a low tumbling basket speed; a relay having a pickup coil; a sensing circuit including said relay coil and said motor connected so that said relay senses the phase angle variation and energization of said relay coil is cyclically varied in proportion to the magnitude of said motor power phase angle variation; contact means controlled by said relay pickup coil, a pair of stationary contacts alternatively engaged by said relay contact means once each cycle when the variation in said relay coil energization reaches a predetermined magnitude, a first solenoid coil and a first capacitor in parallel with each other and in series with a first of said stationary contacts, a second solenoid coil and a second capacitor in parallel with each other in series with a second of said stationary contacts, means for rectifying the power transmitted to said solenoid coils and capacitors upon engagement of their associated stationary contact by said relay contact means; first normally closed contact means in series with said electric control means controlled by said first solenoid coil to open upon energization thereof, second normally closed contact means in series with said electric control means and in parallel with said first normally closed contact means, said second normally closed contact means being opened by said second solenoid coil upon energization thereof, each of said capacitors discharging through its associated solenoid coil to retain it energized for a period at least equal to the duration of disconnection during one cycle of said relay contact means from the associated stationary contact, whereby cyclic engagement of said relay contact means with said stationary contacts continuously energizes said solenoid coils to cause said electric control means to provide tumble basket speed for redistribution of the clothes.

9. In a laundry machine, a clothes basket rotatable on a substantially non-vertical axis; multi-speed drive means for rotating said basket including an electric induction-type drive motor, said multi-speed drive means being effective to drive said basket at a low speed for tumbling and distributing clothes, at a high speed for extracting liquid from said clothes, and for a limited period prior to acceleration from a tumbling speed to an extraction speed at an intermediate speed just high enough to effect plastering of the clothes around the periphery of said basket; said basket being responsive to the force of gravity acting on an unbalanced plastered distribution of the clothes within said basket to provide a varying torque feedback to said motor resulting in a cyclic variation in the phase angle of the motor power of the same frequency as the r.p.s. speed of said basket; electric control means effective when energized to cause acceleration from tumbling speed through said plaster speed to said spin speed unless de-energized prior to completion of provision of the spin speed; a relay having a pickup coil; a circuit including said relay coil and said motor connected so that said relay senses the phase angle variation and energization of said relay coil is cyclically varied in proportion to the magnitude of said motor power phase angle variation; and a control circuit connected to be cyclically modified by said relay when the variation in said relay coil energization reaches a predetermined magnitude during rotation of said basket at plaster speed, said control circuit providing during said cyclic modification thereof a continuous deenergizing signal to said electric control means to cause said drive means to decrease the basket speed back to tumbling to effect redistribution of the clothes.

10. In a laundry machine, a clothes basket rotatable on a substantially non-vertical axis; multi-speed drive means for rotating said basket including an electric induction-type drive motor, said basket being responsive to the force of gravity acting on an unbalanced plastered distribution of clothes within said basket to provide a torque feedback to said motor resulting in a cyclic variation in the phase angle of the motor power of the same frequency as the r.p.s. speed of said basket; electric control means for determining the speed transmitted by said drive means to said basket; a relay having a pickup coil; a sensing circuit including said relay coil and said motor connected so that said relay senses the phase angle variation and energization of said relay coil is cyclically varied in proportion to the magnitude of said motor power phase angle variation; and a control circuit, said control circuit including contact means controlled by said relay coil, a pair of stationary contacts, said relay contact means being movable to a closed position with said pair of contacts alternatively once each cycle when the cyclic variation of said relay coil energization reaches a predetermined magnitude, said control circuit including a solenoid coil, a pair of capacitors each arranged to discharge through said solenoid coil, means for rectifying power to said solenoid coil and said capacitors, said solenoid coil being energized to a limited extent and one of said capacitors being charged in response to engagement of said relay contact means with either one of said stationary contacts, said solenoid coil being energized at a higher level when said relay coil cyclically causes engagement of said relay contact means with said stationary contacts once each cycle by combination of the direct energization of said solenoid coil and the simultaneous discharge of one of said capacitors through said solenoid coil, contact means in circuit with said electric control means controlled by said solenoid coil and movable from a first position to a second position when said solenoid coil is energized at said higher level, said second position of said solenoid coil contact causing said electric control means to decrease the basket speed sufficiently to effect redistribution of the clothes.

11. In a laundry machine, a clothes basket rotatable on a substantially non-vertical axis; multi-speed drive means for rotating said basket including an electric induction-type drive motor, said basket being responsive to the force of gravity acting on an unbalanced plastered distribution of clothes within said basket to provide a varying torque feedback to said motor resulting in a cyclic variation in the phase angle of the motor power of the same frequency as the r.p.s. speed of said basket; electric control means for determining the speed transmitted by said drive means to said basket; a relay having a pick-up coil, a movable plunger member, means biasing said plunger member in a predetermined direction, said plunger member being pulled in the opposite direction by energization of said coil, contact means secured to said plunger member and movable therewith, a contact assembly comprising a pair of contacts on opposite sides of said plunger contact means, one of said contacts being engaged by said plunger contact means upon a predetermined amount of movement of said plunger in said one direction and the other said contact being engaged by said plunger contact means upon a predetermined amount of movement thereof in the opposite direction whereby said plunger contact means engages each of said pair of contacts once each cycle at a predetermined degree of cyclical variation of the relay coil energization, said contact assembly being movably mounted to be moved in response to engagement of said plunger contact means with one of the contacts of said assembly, and means damping said contact assembly movement; a sensing circuit including said relay coil and said motor connected so that said relay senses the phase angle variation and energization of said relay coil is cyclically varied in proportion to the magnitude of said motor power phase angle variation; and a control circuit including each of the contacts of said contact assembly so as to receive cyclic impulses when the cyclic variation in the energization of said relay coil is large enough to cause cyclic making and breaking with said pair of contacts by said plunger contact means, said control circuit being arranged to provide in response to said cyclic making and breaking a continuous signal to said electric control means to cause said drive means to decrease the basket speed sufficiently to effect redistribution of the clothes.

12. In a laundry machine, a clothes basket rotatable on a substantially non-vertical axis; multi-speed drive means for rotating said basket including an electric induction-type drive motor, said basket being responsive to the force of gravity acting on an unbalanced plastered distribution of clothes within said basket to provide a varying torque feedback to said motor resulting in a cyclic variation in the phase angle of the motor power of the same frequency as the r.p.s. speed of said basket; electric control means for determining the speed transmitted by said drive means to said basket; a relay having a pick-up coil; a sensing circuit including said relay coil and said motor connected so that said relay senses the phase angle variation and energization of said relay coil is varied in proportion to the magnitude of said motor power phase angle variation; a movable plunger member, spring means biasing said plunger member in a first direction, said coil biasing said plunger member in the opposite direction to a degree proportional to the degree of coil energization, means positioned to be engaged by said plunger member upon movement in said first direction so as to be carried along therewith, means for causing said last mentioned member to follow said plunger member at a decreased rate of speed when said plunger member is moved in said opposite direction, first contact means secured to said plunger member, second contact means secured to said following member, said contact means engaging each other upon a predetermined amount of lag of movement of said following member behind said plunger member in said opposite direction whereby said contact means engage each other once per cycle when the cyclic variations in the energization level of said coil reach a predetermined magnitude; and a control circuit including said contact means, said control circuit being cyclically modified during cyclic engagement of said contact means, and providing during said cyclic modification a continuous signal to said electric control means to cause said basket speed to be decreased sufficiently to effect redistribution of the clothes.

No references cited.